(12) United States Patent
Reissing et al.

(10) Patent No.: US 11,525,893 B2
(45) Date of Patent: Dec. 13, 2022

(54) OPTICAL SENSOR DEVICE WITH A TRANSMISSION UNIT, WITH A RECEIVING UNIT, AND WITH AN EVALUATION UNIT FOR SCANNING THE RECEIVED SIGNAL AT AT LEAST ONE SCANNING POINT IN ITS RISING AND/OR FALLING FLANK

(71) Applicant: Balluff GmbH, Neuhausen a.d.F. (DE)

(72) Inventors: Tobias Reissing, Filderstadt (DE); Manuel Bronner, Reutlingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 484 days.

(21) Appl. No.: 16/804,198

(22) Filed: Feb. 28, 2020

(65) Prior Publication Data

US 2020/0292668 A1 Sep. 17, 2020

(30) Foreign Application Priority Data

Mar. 15, 2019 (DE) ...................... 10 2019 106 707.3

(51) Int. Cl.
| | | |
|---|---|---|
| *G01S 7/48* | (2006.01) | |
| *G01S 7/481* | (2006.01) | |
| *G01S 17/32* | (2020.01) | |
| *G01B 11/14* | (2006.01) | |
| *G01S 7/484* | (2006.01) | |
| *G01S 7/4861* | (2020.01) | |
| *G01S 17/04* | (2020.01) | |

(52) U.S. Cl.
CPC ............ *G01S 7/4811* (2013.01); *G01B 11/14* (2013.01); *G01S 7/484* (2013.01); *G01S 7/4861* (2013.01); *G01S 17/04* (2020.01); *G01S 17/32* (2013.01)

(58) Field of Classification Search
CPC ......... G01B 11/14; G01S 17/02; G01S 17/04; G01S 17/06; G01S 17/10; G01S 7/48
USPC .................................. 250/214 R, 221, 214.1
See application file for complete search history.

(56) References Cited

U.S. PATENT DOCUMENTS

| | | | | |
|---|---|---|---|---|
| 3,865,974 A | * | 2/1975 | Alpers | ................ G01S 3/7864 |
| | | | | 250/203.5 |
| 7,787,131 B1 | | 8/2010 | Moran | |
| 2011/0246116 A1 | | 10/2011 | Kamitani et al. | |
| 2012/0185209 A1 | | 7/2012 | Lewis | |

FOREIGN PATENT DOCUMENTS

| | | |
|---|---|---|
| EP | 2 302 415 A1 | 3/2011 |
| WO | 01/029576 A1 | 4/2001 |

OTHER PUBLICATIONS

German Office Action dated Oct. 28, 2019 in German Application No. 10 2019 106 707.3 with English translation.

* cited by examiner

*Primary Examiner* — Que Tan Le
(74) *Attorney, Agent, or Firm* — Collard & Roe, P.C.

(57) ABSTRACT

An optical sensor device has a transmission unit for emitting light, a receiving unit for light emitted by the transmission unit, and an evaluation unit for evaluating a receive signal, which is based on the received light, wherein the emitted light is designed as a light pulse which is based on a transmission signal, which has a signal shape with a rising and/or falling flank, wherein the receive signal has substantially the same signal shape as the transmission signal, wherein the evaluation unit is suitable for scanning the receive signal at at least one scanning point in its rising and/or falling flank.

27 Claims, 5 Drawing Sheets

OPTICAL SENSOR DEVICE WITH A TRANSMISSION UNIT, WITH A RECEIVING UNIT, AND WITH AN EVALUATION UNIT FOR SCANNING THE RECEIVED SIGNAL AT AT LEAST ONE SCANNING POINT IN ITS RISING AND/OR FALLING FLANK

CROSS REFERENCE TO RELATED APPLICATIONS

Applicant claims priority under 35 U.S.C. § 119 of German Application No. 10 2019 106 707.3 filed Mar. 15, 2019, the disclosure of which is incorporated by reference.

BACKGROUND OF THE INVENTION

1. Field of the Invention

The invention relates to an optical sensor device, a method for operating an optical sensor device, a computer program as well as a machine-readable storage medium.

2. Description of the Related Art

It is known from the field that the demand for optical sensor devices is increasing in view of ever increasing detection ranges. Due to this, it is necessary that the dynamic range of such sensor devices must be ever increased in order to ensure an adjustability of the sensory device over the whole working range. Here, the dynamic range can be defined as the ratio of the largest detectable receive signal to the smallest detectable receive signal. It is further known that, in the case of a simple preamplifier in a receiving path of the sensor device, the dynamic range can be limited by the resolution of the analogue-to-digital converter (ADC) used which lies at 12 Bit for typical low-cost microcontrollers of today. This is no longer sufficient for today's requirements for the object range.

Furthermore, the requirements for optical sensor devices are also increasing with respect to greater flexibility, i.e. a sensor device shall realise differing sensor principles such as a light sensor, reflex light barrier and through-beam barrier with a hardware structure, for example. These different sensor principles also require differing dynamic ranges.

It is also known from the field that, in order to increase the dynamic range of optical sensor devices, several transmission pulse packages can be used, the signal shapes of which are rectangular pulses with variable height. Several preamplifiers with different amplification can be used in a receiving path of the sensor device in order to appropriately amplify the received light. It is also possible to use preamplifiers with adjustable amplification in the receiving path in order to appropriately shape the received light. Typically, an amplitude or a pulse height of the rectangular pulse can then be evaluated.

For example, from EP 2 302 415 A1, an optical sensor device and a method for operating the sensor device are known. The sensor device is implemented as an optoelectronic sensor device, for example as a light sensor, reflex light barrier or through-beam barrier. In a transmission path of the sensor device, a series of rectangular pulses is produced such that an average optical output power of a transmission unit of the sensor device is set to a constant value independent of the setting of the switching distance and/or the sensitivity when using an appropriate control.

SUMMARY OF THE INVENTION

The object of the invention is to implement a sensor device which has a high dynamic at simultaneously low construction costs, low space requirement and low energy and heating consumption.

This object is solved by an optical sensor device, a method for operating a sensor device, a computer program as well as a machine-readable storage medium according to the independent claims. Advantageous embodiments are provided in the dependent claims.

According to a first aspect, an optical sensor device is provided having a transmission unit for emitting light, a receiving unit for light emitted by the transmission unit (or parts thereof) and an evaluation unit for evaluating a receive signal which is based on the received light, wherein the emitted light is formed as a light pulse, which is based on a transmission signal which has a signal shape having a rising and/or falling flank, wherein the receive signal substantially has the same signal shape as the transmission signal, wherein the evaluation unit is suitable for scanning the receive signal at at least one scanning point (for example at a scanning point or at several temporally different scanning points) in its rising and/or falling flank.

The sensor device can therefore be based on the principle that it can provide a signal shape of the transmission signal which, when received, can be substantially identical to a signal shape of the receive signal. In this way, the type of the signal shape can be the same, and the amplitudes and/or slope of the transmission signal and of the receive signal can differ from one another. In this way, the emitted light pulse in the case of a reflex light barrier or a reflex light sensor can be received again after being reflected on an object. In the case of a through-beam barrier, the emitted light pulse can be disrupted by the object and be optionally absorbed (in particular partially) before it is received again by the sensor device.

When scanning, for example determining point-by-point, the receive signal in its (in particular monotonous) rising and/or (in particular monotonous) falling flank, different signal strengths can be ascertained which are adapted for determining different object distances and/or differing object brightnesses at a good resolution. A scanning point can, in this way, refer to a measurement time point seen in time which can deliver an allocated scanning (measurement) value. A flank in the signal shape can in this way be a rising or falling branch of the signal with a slope different to infinity (i.e. not an ideal rectangular light pulse). In the case of a reflex light barrier or scanner, an object distance can refer to a distance between the sensor device and the object on which the emitted light can be reflected before its receival by the receiving unit. In the case of a through-beam barrier, the object distance can correspond to a distance between the transmission unit of the sensor device and the object which interrupts the emitted light before its receival. An object brightness can refer to a reflecting power of the object and/or radiation power of the object (optionally after absorption has taken place).

Overall, on account of the measuring principle, a dynamic range (in particular of the analogue signal processing) of the sensor device can be raised easily without an expensive hardware implementation of the sensor device having to be provided in particular in the receiving path. The hardware implementation necessary for the evaluation of the receive signal can, in this way, be available in low-cost components such as in digital-to-analogue converts (DAC) or comparator stages of micro-controllers or processors without expensive switches, operational amplifiers or preamplifiers having to be integrated into the transmission path of the sensor device. In the case of a comparator stage, this can be designed with only 1 to n stages such that, with such a component, a time between the beginning of the flank and the achieving of the comparator threshold can be a measurement for the "object brightness" or for the object distance. In this way, the sensor device can overall be implemented cost-effectively and with a low space requirement, and the sensor device can be integrated into small devices (such as for example the BOS 5K or the BOS 21M of the company Balluff).

On account of the measuring principle of the sensor device, it may not be necessary to produce several light pulses as a pulse packet for an individual measurement, such that energy consumption and heat consumption in the transmission path can be particularly low and no lowering of a switching frequency of several light pulses has to be available in the transmission path. In contrast to this, when using several light pulses for repeated individual measurements, the switching frequency of the pulses can be increased since the energy and heating usage per individual measurement can be low. In addition, the receiving path can require an amplification with lower bandwidth than when using (ideal or real) rectangular impulses, which increases the interference resistance of the sensor device. In this way, the necessary lowered bandwidth can be a series of the lowered flank steepness of the receive signal in contrast to a received rectangular pulse, since the required bandwidth of the amplifying stage can primarily depend on the duration of the rising or falling flank of the receive signal. Because of the low bandwidth of the amplifying stage, the sensor device can additionally be insensitive towards electromagnetic compatibility (EMC) disturbances.

On account of the signal shape of the transmission signal and of the receive signal, only one single light pulse can be irradiated instead of several light pulses for an individual measurement, such that a current consumption or heat generation in the transmission path can be low.

In an embodiment, the one or several scanning points is fixed with regards to time in a scanning process of the receive signal. In this way, a temporally defined scanning process can be carried out which can deliver reproducible scanning values with each new measurement under the same measurement conditions or can generate a defined sequence of scanning values with different measurement conditions. Overall, the dynamic range of the sensor device can be increased by the sequence of the temporally fixed scanning points.

In an embodiment, a scanning point (i.e. the one scanning point or a scanning point of the several scanning points) is, with respect to time, allocated to a low transmission current in a transmission path. On account of the speed of light, the emitted light pulse and the received light and thus the transmission signal and the receive signal can be temporally correlated and can increase in terms of their amplitude at a same time point, can reach their maximum or fall to zero. In this way, a defined transmission current in the transmission path can be allocated to each scanning point, with which the transmission unit applies and can be stimulated to emit the light pulse. If a scanning value can be ascertained for the scanning point with a low transmission current, then this scanning point can be used for the evaluation of light objects and/or objects with a low object distance since the scanning value allocated to the scanning point can be correspondingly high.

In an embodiment, a scanning point (i.e. the one scanning point or a scanning point of the several scanning points) can be allocated with respect to time to a high transmission current in a transmission path. When evaluating the scanning value for such a scanning point with a high transmission current, dark objects and/or objects with a high object distance can be detected since the scanning value can be correspondingly small but can still be measured easily, and a saturation performance of the evaluation unit for too large values of the receive signal cannot come into effect.

In an embodiment, a signal shape of the transmission signal and of the receive signal is designed as triangular, trapezoid, parabolic or sinusoidal. All of these embodiments of the transmission signal or of the receive signal can have the rising and/or falling flank which can be scanned when evaluating the receive signal. These signal shapes can all be generated particularly easily.

In an embodiment, the evaluation unit can be suitable for scanning the receive signal at at least two (in particular temporally offset) scanning points in its rising flank and/or at at least two (in particular temporally offset) scanning points in its falling flank. This kind of scanning can require that the signal shape of the receive signal can be designed differently from a real rectangular pulse. In this way, as described above, an amplification with low bandwidth can be provided in the receiving path.

In particular, the transmission signal can represent, with respect to time, a short light pulse such that the object brightness or the object distance can be approximately constant during the duration of the light pulse, and the scanning values for the different scanning points can lead to approximately equal evaluation results for the brightness or object distance, provided that they are evaluable.

In an embodiment, the receive signal for the scanning at a scanning point with allocated low transmission current is amplifiable and/or the receive signal for the scanning at a scanning point with allocated high transmission current is decreasable. In this way for the evaluation, a signal that is too small or a signal which, on account of a saturation performance of the sensor device, can be too big, can be changed appropriately before the evaluation. In this way, again, the dynamic range of the sensor device can be adjusted in an easy and cost-effective manner. The evaluation can take into account the signal setting as a result of the amplification in the receiving path of the sensor device.

In an embodiment, an amplification of the receive signal and/or a reduction of the receive signal is constant in terms of time. In other words, the amplification or reduction factor of the amplifier stage or preamplifier stage in the receiving path can correspond to a constant factor for one or several receiving pulses, such that all of the scanning values of the one receiving pulse or of the several receiving pulses can be changed uniformly. In other words, the setting of the scanning signal can be constant as a result of the amplification in the receiving path, i.e., carried out with a constant amplification or reduction factor, such that the evaluation can take into account the signal chancing particularly easily throughout.

In an embodiment, the sensor device is suitable for terminating the transmission signal when the evaluation unit has scanned an evaluable scanning point. In this way, electricity can be saved in the transmission path and the heat input can be reduced.

In particular, the evaluation unit can be suitable for comparing the scanning values allocated to several scanning points and for discarding such scanning value or values when such scanning value or values deviate from one another more and/or less than a corresponding threshold value. For this purpose, differences between each two scanning values can be calculated and this difference value can be compared to the threshold value. Should one, several or all of the differences be larger and/or smaller than the corresponding threshold value, then the measurement as a whole can be discarded. Alternatively, just the corresponding scanning value can be discarded which deviates significantly. Each two scanning measurement values which are compared to one another and can, in this way, each be allocated to an identical, in particular, fixedly predetermined time interval between the allocated scanning points. In this way, the interference resistance of the sensor device against extraneous light which could manifest itself as a scanning-outlier, and, in this way, its precision can be increased. Such scanning values can also be discarded which refer back to a saturation performance in an analogue-to-digital converter and/or preamplifier which can be found in the receiving path.

In an embodiment, the evaluation unit is suitable for ascertaining a slope of the flank when scanning at least two scanning points in the rising flank and/or when scanning at least two scanning points in the falling flank. Here, the slope can be used to verify the validity of the scanning values measured. Alternatively or additionally, the slope can be used as a sensor measuring signal in order to ascertain the object brightness and/or the object distance with corresponding highlighted characteristic curves. Overall, the interference resistance of the sensor device can be increased.

In an embodiment, the evaluation device is suitable for discarding, when determining the slope of the flank, one of the two scanning values or both scanning values, for which its determined slope or for which their determined slope deviates from the remaining slope of the flank more and/or less than a corresponding threshold value. If, for example, four scanning values were ascertained, six slope values can be ascertained for the flank. If one or more of the flank values then significantly deviates from the remaining slope values or from an averaged slope of the flank which can be calculated based on all slope values, then only the one relevant scanning value can be discarded, which has led to the deviating slope values(s). Alternatively, it can also be possible to discard all scanning values whose slopes deviate. In the previous option, more scanning values remain for the evaluation than in the latter option. The entire receiving pulse can also be discarded. By means of this measure, as already explained above, measurement outliers and/or scanning values can be removed because of a saturation in the receiving path.

In an embodiment, the evaluation unit is suitable for ascertaining whether the scanned, at least one scanning point is sufficient to ascertain a valid sensor signal of the sensor device. For this purpose, for example, after discarding measurement outliers and/or scanning values on account of a saturation in the receiving path, the remaining scanning values can be evaluated in order to determine whether a valid sensor signal can be ascertained out of said values. It can, for example, be provided that a minimum number of scanning values must remain to produce the valid sensor signal.

In an embodiment, the evaluation unit is suitable for scanning at least one further scanning point which is temporally offset from the receive signal to be scanned and for taking into account a further scanning point allocated to a scanning value when ascertaining a sensor signal. In this way, a dark measurement can be carried out in order to recognise extraneous light and to correct the scanning values of the receive signal mathematically around this proportion (e.g. by calculating the difference of each scanning value of the receive signal and the scanning value of the dark measurement). As a result, a precision of the sensor device can be improved.

The sensor device can have at least one preamplification in a receiving path of the sensor device. This can be provided in the receiving path before an analogue-to-digital converter.

The sensor device can additionally or alternatively have a single preamplification stage in the transmission path which can be implemented, for example, by means of a transistor in a constant current source which can be provided after a digital-to-analogue converter. A further amplification of the current in the transmission path might not be provided. In particular it might not be necessary to provide technically complex and expensive preamplifiers, operational amplifiers or switches etc. in the transmission path which would unnecessarily increase the space requirement of the transmission path.

The sensor device can be designed as an optoelectronic sensor device, in particular as a reflex light barrier or as a through-beam barrier which can only evaluate the object intensity, or as a light sensor which can evaluate the object intensity as well as the object distance. In the case of a light sensor, it can be designed as a reflected light sensor.

The sensor device can also have a multi-channelled receiving amplification stage in the receiving path which can be realised for example in sensor devices with background suppression (2 channel amplification stage) or in colour and contrast scanners (3 channel amplification stage). In such a realisation, the received light pulse can be amplified differently per channel (each optionally over the time of a received pulse with a constant factor larger or smaller than 1) such that, out of each channel, a separate receive signal is available.

According to a second aspect, a method for operating a sensor device is provided which involves the steps of emitting light, receiving the emitted light and evaluating a receive signal which is based on the received light, wherein the emitted light is designed as a light pulse which is based on a transmission signal which has a signal shape with a rising and/or falling flank, wherein the receive signal has substantially the same signal shape as the transmission signal, wherein the evaluation of a receive signal involves scanning the receive signal at at least one scanning point in its rising and/or falling flank.

The method can have the same embodiments and/or advantages as the sensor device according to the first aspect. The emitting of light can be carried out by the transmission unit, the receiving of light can be carried out by the receiving unit and the evaluation of the receive signal can be carried out by the evaluation unit of the sensor device.

In an embodiment, the at least one scanning point is temporally fixed in a scanning process.

In an embodiment, a scanning point with respect to time is allocated to a low transmission current in a transmission path.

In an embodiment, a scanning point with respect to time is allocated to a high transmission current in a transmission path.

In an embodiment, a signal shape of the transmission signal and of the receive signal is triangular, trapezoid, parabolic or sinusoidal.

In an embodiment, the evaluation of a receive signal has scanning of the receive signal at at least two scanning points in its rising flank and/or at at least two scanning points in its falling flank.

In an embodiment, the receive signal for scanning at a scanning point with an allocated low transmission signal is amplified, and/or the receive signal for the scanning at a scanning point with an allocated high transmission current is decreased.

In an embodiment, an amplification of the receive signal and/or a decrease of the receive signal is carried out constantly in time.

In an embodiment, the transmission signal is terminated when an evaluable scanning point is scanned.

The method can further involve the steps of comparing the scanning values allocated to the scanning points to one another and discarding of the scanning values when the scanning values deviate from one another more and/or less than a corresponding threshold value.

In an embodiment, the evaluation of the receive signal further involves determining a slope of the flank when scanning at least two scanning points in the rising flanks and/or when scanning at least two scanning points in the falling flank.

In an embodiment, the evaluation of the receive signal further involves discarding, when determining the slope of the flank, at least one of the two scanning values for which its determined slope deviates from a remaining slope of the flank more and/or less than a corresponding threshold value.

In an embodiment, the evaluation of the receive signal further involves determining whether the scanned, at least one scanning point is sufficient to ascertain a valid sensor signal.

In an embodiment, the evaluation of the received sensor further involves scanning at at least one further scanning point which is temporally offset from the receive signal to be scanned and taking into account a scanning value allocated to a further scanning point upon a determination of a sensor signal.

According to a third aspect, a computer program is provided which is designed to carry out steps of a method according to the second aspect when it is carried out by the sensor device according to the first aspect. The computer program can have instructions and create a control code which comprises an algorithm for carrying out the method according to the second aspect.

According to a fourth aspect, a machine-readable storage medium is provided, on which a computer program according to the third aspect is stored. The machine-readable storage medium can for example be designed as external storage, as internal storage, as a hard drive or as a USB storage device.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

The same or similar components are provided with the same reference numerals.

Figure 1:
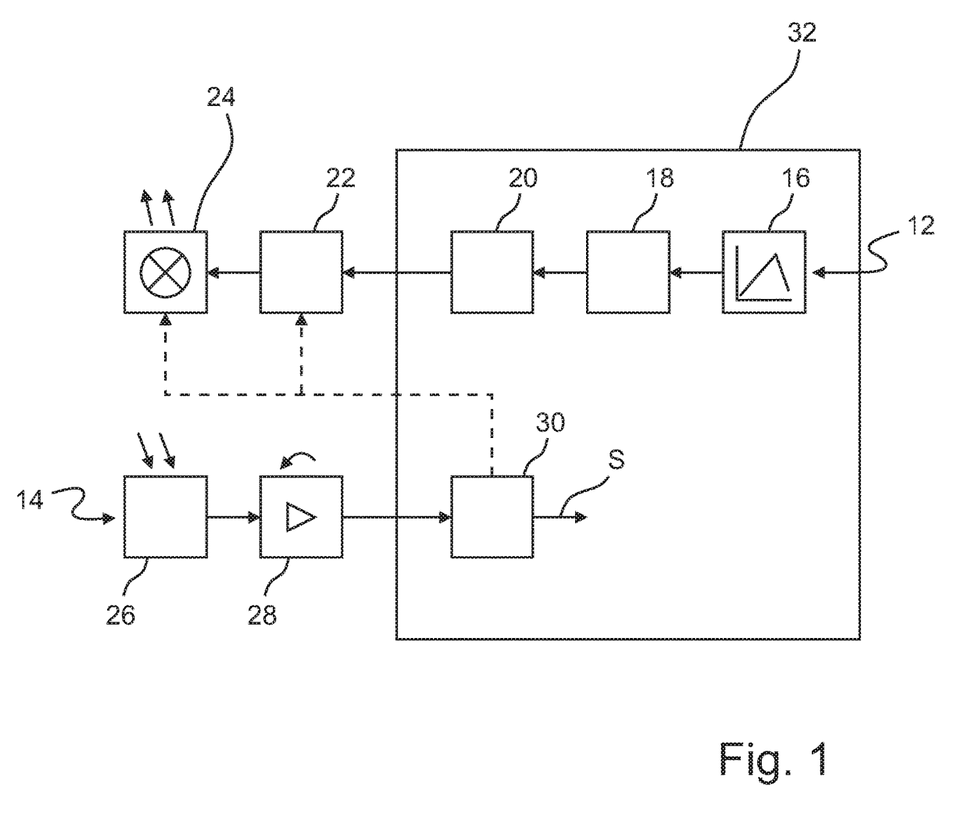
FIG. 1 shows a schematic view of an optical sensor device according to an exemplary embodiment.

An optical sensor device provided in FIG. 1 with the reference numeral 10 has a transmission path 12 and a receiving path 14. In the sensor path 12, a storage unit 16 is provided in which digitalised voltage values of a transmission signal are filed in a saved look-up table. An output signal of the storage unit 16 is provided for a transfer unit 18 for transferring the signal to a digital-to-analogue converter (DAC) 20. The transfer unit 18 is designed to transfer the digitalised voltage values of the look-up table one after the other and transfer them in a fixed time interval into digital voltage values for the DAC 20 and to output the digital voltage values to the DAC 20. An output signal of the DAC 20 in the form of an analogue voltage can be supplied to a transmission stage 22 which is designed to transform the analogue voltage of the DAC 20 into a current which is proportional to the analogue voltage and to supply it as a corresponding output signal of a transmission unit 24, for example in the form of an LED or a laser. The transmission unit 24 is designed to emit light in the form of a light pulse for an individual measurement or in the form of several light pulses in the case of repeated individual measurements. A light characteristic of the light pulse is based in this way on the output signal of the transmission stage 22.

In this way, the transmission stage 22 can be designed as a constant current source, by means of which an amplification of the transmission signal can be carried out. Typically, input voltages of the constant current source lie at up to 3.3V, and a pulsed, constant output voltage typically lies in a region of from 100 to 135 milliampere for a transmission unit 24 designed as an LED.

In the receiving path 14, a receiving unit 26, for example in the form of a photodiode (PD) or a photosensitive detector (PSD) is provided which is designed to receive the light emitted from the transmission unit 24 after reflection on an object which is to be examined by means of the sensor device 10 or after a passage through the object and transform it into a photocurrent. An output signal of the receiving unit 26, i.e. the photocurrent, can be supplied to a preamplifier 28 which is designed to transform the received photocurrent into a receive signal, which corresponds to an analogue voltage, and optionally amplify it constantly over time for the one light pulse or for the several light pulses, or constantly decrease it. An output signal of the preamplifier 28 in the form of the analogue voltage can be supplied to an analogue-to-digital converter (ADC) 30 which is designed to scan a rising and/or falling flank of the receive signal at several scanning points fixed in time and to ascertain corresponding scanning (measured) values. An output signal S of the ADC 30 corresponds to a digitalised voltage value of the preamplifier 28, i.e. to a digital voltage. This output signal comprises a piece of information about an object brightness and/or an object distance.

Instead of the ADC 30, a comparator can be provided which converts the analogue voltage of the preamplifier 28 into the digital voltage.

The ADC 30 is further optionally designed to output a feedback signal to the transmission stage 22 and/or to the transmission unit 22, if there is a valid scanning value, in order to immediately terminate the transmission of the light pulse. The ADC 30 is also optionally designed to compare the scanning values for the several scanning points in the signal flank with one another and to discard the measurement, if the scanning values differ significantly from one another, i.e. for example a difference of any two random scanning values is larger and/or smaller than the corresponding predetermined threshold value.

The ADC 30 is further optionally designed to ascertain a slope of the flank respectively out of two scanning values in the flank of the analogue voltage. The ADC 30 can further optionally be designed to discard at least one of the two scanning values or both scanning values for which the determined slope of which deviates from a remaining slope of the flank more and/or less than a corresponding threshold value. The entire receiving pulse can also be discarded when a deviation exists.

The ADC 30 can also be optionally designed to determine whether the scanned scanning point or points are sufficient to ascertain the valid sensor signal S. In the case that scanning values are discarded by the ADC 30, the ACD 30 can be designed to evaluate the remaining scanning values for the validity of the signal S.

The ADC 30 can optionally be designed to define and scan one or more further scanning points which are temporally offset to the receive signal to be scanned and to take into account mathematically the allocated scanning values when ascertaining a sensor signal S as a dark measurement.

The units 16, 18, 20 and 30 are part of a control unit and evaluation unit 32 which is designed, for example, as a processor or a microcontroller.

Figure 2:
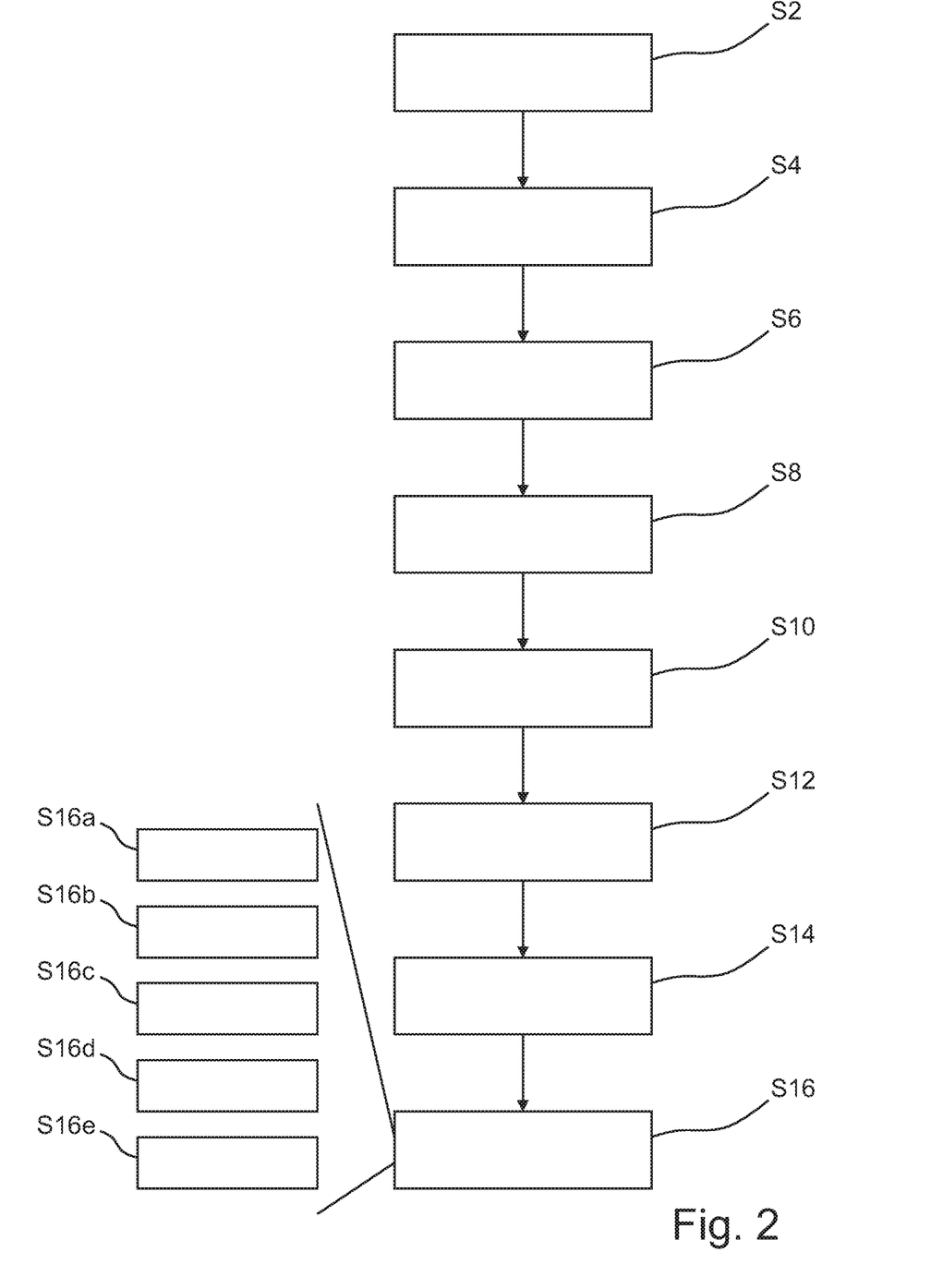
FIG. 2 shows a flowchart which illustrates a method according to an exemplary embodiment which is carried out with the sensor device in FIG. 1.

When the device 10 is in operation according to the exemplary embodiment, as shown in the flowchart in FIG. 2, in a first method step S2, a signal shape of a transmission pulse in the form of discrete values is provided from a look-up table by means of the storage unit 16. In a next method step S4, the digital voltage values of the signal shape are supplied one after the other and in a fixed time frame to the DAC 20 by means of the transfer unit 18. In a further method step S6, by means of the DAC 20, the signal is outputted as analogue voltage values. In a next method step S8, by means of the transmission stage 22, this analogue voltage is transformed as a current which is proportional to the voltage (optionally amplified) and supplied to the transmission unit 24. In a method step S10, by means of the transmission unit 24, a light pulse is emitted according to the supplied current. The steps S2-S10 can be carried out repeatedly such that several individual measurements can be carried out one after the other.

In a further method step S12, by means of the receiving unit 26, the light emitted, or parts thereof, are received again and outputted as a photocurrent to the preamplifier 28. In a method step S14, the current is outputted by means of the preamplifier 28 (optionally with a factor which is constant in time for the light pulse(s)) as an analogue voltage. In a method step S16, by means of the ADC 30, the receive signal is scanned and is further processed according to the functionalities described above for the ADC 30, and the sensor signal S is outputted in the form of a digital voltage and optionally the feedback signal is also outputted.

In a possible implementation of the step 16, firstly, in a sub-step S16a, the receive signal in the ADC 30 can be scanned at defined scanning points, and the corresponding scanning values can be determined. In a further sub-step S16b, a correction of all of the determined scanning values for external light can be carried out by, for at least one scanning point which is temporally offset to the receive signal, i.e. outside the time interval of the receive signal, a scanning value being able to be determined and this being removed from all of the scanning values determined in the sub-step S16a. In an optional sub-step S16c, such scanning values can be discarded individually which deviate to a greater and/or smaller extent from further scanning values than corresponding threshold values. The entire received pulse can also be discarded if a significant deviation for a scanning value is provided. In a further sub-step S16d, the scanning values (which remain after the discarding) can be determined, taking into account appropriate characteristic curves of the sensor signal S, which has information about the object brightness and/or the object distance. In an optional sub-step S16e, slope values for the scanning points and scanning values of the receive signal can be determined in the ADC 30. These determined slope values can (using corresponding threshold values) be compared to one another, in order to discard individual scanning values or the entire receive signal out of the further evaluation. Then, out of the remaining scanning values after the discarding and/or slopes taking into consideration appropriate characteristic curves, the sensor signal S can be determined which has the piece of information about the object brightness and/or the object distance. Alternatively, it is possible that the sensor signal S is determined directly out of the slopes, i.e. without discarding further scanning points. If the sub-step S16e is carried out, the sub-step S16d can be omitted. Before a further processing of the scanning values after a discarding of individual scanning values in the sub-steps S16d, S16e it is possible as part of the sub-step S16d, S16e that the remaining scanning values are evaluated as to whether a valid sensor signal S could be determined out of them. This evaluation can for example be positive when a sufficiently large number of scanning values remains for the evaluation.

Figure 3:
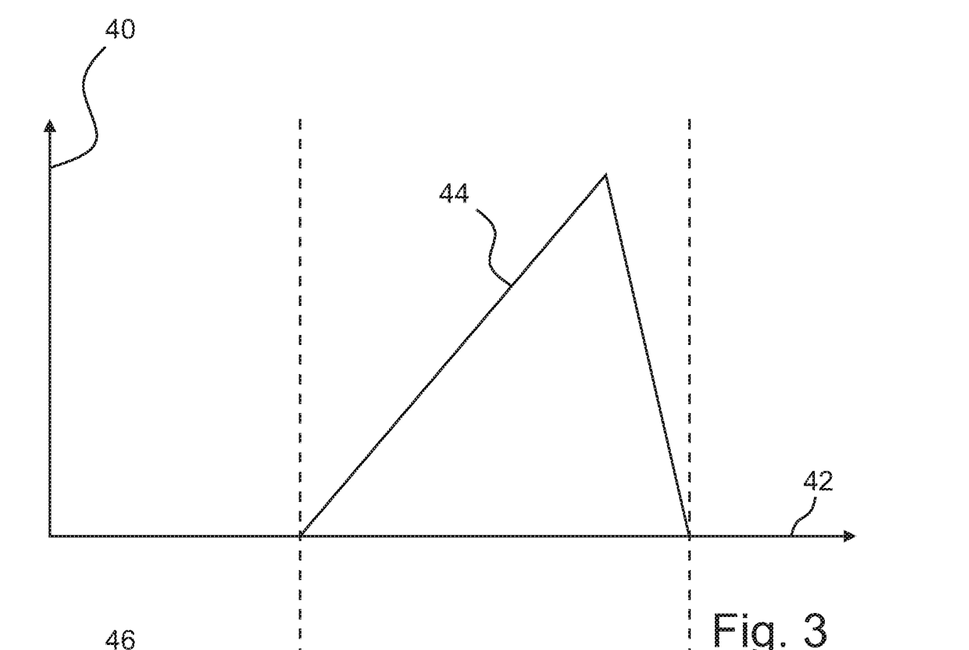
FIG. 3 shows a schematic depiction of a time-dependent process of a transmission signal of the sensor device in FIG. 1.

FIG. 3 shows an output signal of the DAC 20 which is produced in the method step S8 in the form of the analogue voltage which, on account of the proportionality of transmission current and voltage of the DAC 20, corresponds to the temporal progression of the transmission current of the transmission stage 22. Here, an ordinate 40 refers to the amplitude of the transmission signal in arbitrary units and an abscissa 42 to the time in arbitrary units. The signal shape of the transmission signal 44 is a triangular-shaped pulse.

Figure 4:
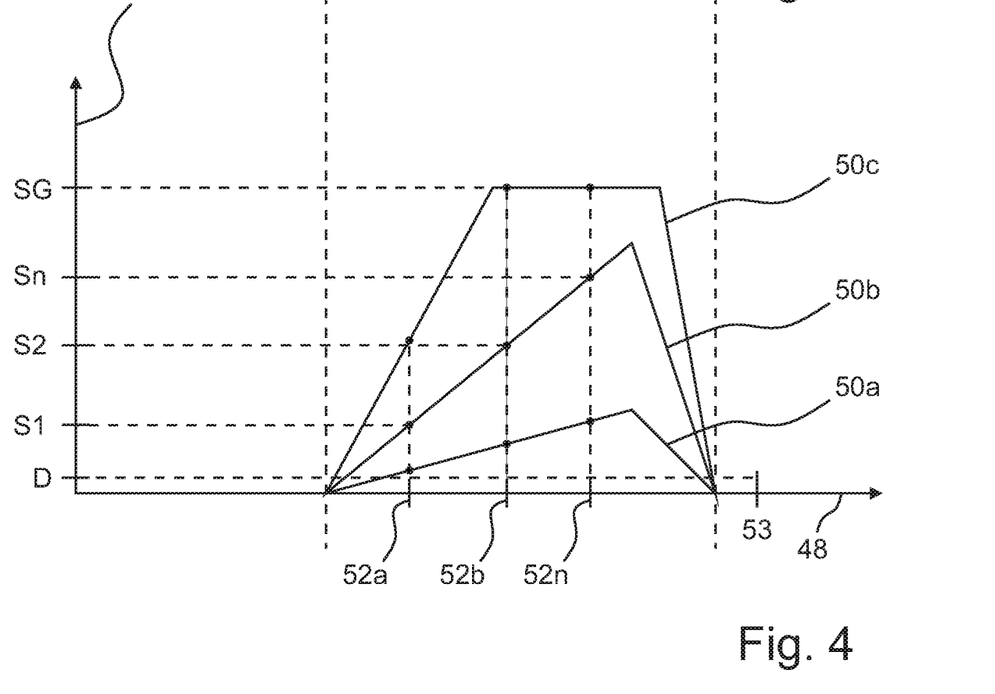
FIG. 4 shows a schematic depiction of a time-dependent process of receive signals of the sensor device in FIG. 1 which have different signal strengths.

FIG. 4 shows an output signal of the preamplifier 28 which is produced in the method step S14, i.e. the receive signal designed as a voltage. Here, an ordinate 48 refers to the amplitude of the receive signal in arbitrary units and an abscissa 48 to a time in arbitrary units (but the same units of FIG. 3). A curve 50a refers to a signal shape of the receive signal for a dark object or for a high object distance, a reference numeral 50b refers to a signal shape for a medium-light object or for an average object distance and a reference numeral 50c refers to a signal shape for a light object or for a low object distance. One sees that the signal shape of the receive signal 50a-50c is also triangular and that the amplitude of the receive signal 50a-50c with the same measurement time increases with increasing object brightness or decreasing object distance. One also sees that the slope of the rising and/or falling flank of the receive signal 50a-50c is dependent on the signal strength of the receive signal 50a-50c. At high signal strengths (light object and/or low object distance), the absolute slope of the receive signal (50a-50c) is larger than with dark objects.

Reference numerals 52a, 52b, . . . 52n refer to temporally fixed, temporally varying scanning points in a rising flank of the receive signal 50a-50c. Here, S1, S2, . . . Sn refer to associated scanning values of the receive signal 50a-50c for the corresponding scanning points 52a, 52b, . . . 52n. For convenience, only the scanning points 52 [should read: "52a"; the translator], 52b, 52n or the scanning values S1, S2, Sn are depicted in FIG. 4. The receive signal 50c runs to a saturation limit SL which is conditioned by the preamplifier 28 and/or the ADC 30 such that the curve of the receive signal 50c after the first scanning time point 52a and until the nth scanning time point 52n is constant. As already described above in relation to the functionality of the ADC 30, scanning points which correspond to a measurement outlier and/or saturation values (scanning values for scanning points 52b, 52 for curve 50c) can be disregarded and thus not taken into account before the sensor signal S is determined.

A further scanning point 53 with an associated scanning value is defined to be temporally offset to the receive signal 50a-050c [should read: "50a-50c"; the translator]. An associated scanning value is marked with D. This pair of scanning point 53 and scanning value D corresponds to the dark measurement of the sensor device 10 in order to carry out a calibration of the sensor device 10 with respect to disturbing extraneous light. Here, every scanning value (S1-Sn) can be reduced by the magnitude D (i.e., S1-D, S2-D, Sn-D) in order to determine the sensor signal S. It is noted that several of such scanning points can be defined in order to increase the precision of the dark measurement.

Since the transmission signal 44 and the receive signals 50a-50c have the same signal shape and are temporally correlated (shown via the vertical dotted lines extending across FIGS. 3 and 4) i.e. at the same point in time, an amplitude of the respective signals 44, 50a-50c increases or reaches its maximum or fall to zero, out of the information of the height of the transmission signal at each scanning time point 52a-52n to an object distance of the object on which the light pulse is reflected, to the sensor device 10, a known brightness of the object or a brightness of the object at a known object distance can be deduced. The scanning point 52a is allocated to a transmission signal with a low transmission current and is thus suited to the evaluation of light objects or such objects with a low object distance, since the associated scanning value S1 is large. The scanning point 52n is allocated to a transmission signal with a high transmission current and is thus suited to the evaluation of dark objects or such objects with a high object distance, since the allocated scanning value Sn is small. In other words, by using differing scanning points 52a-52n, very light and very dark objects can be recognised, whereby the dynamic range of the sensor device 10 is increased.

Figure 5:
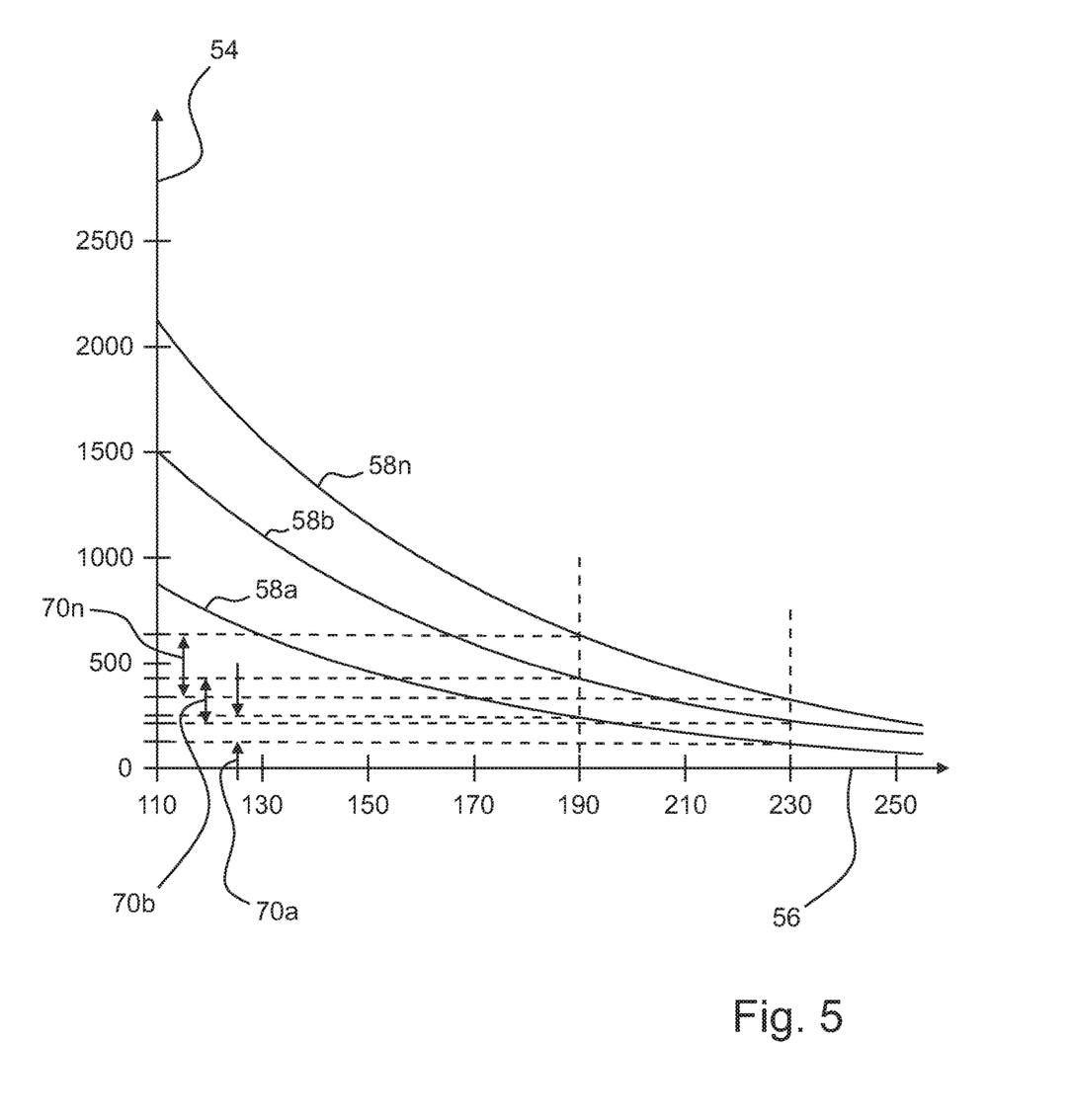
FIG. 5 shows a schematic depiction of characteristic curves for scanning values dependent on a distance from an object to the optical sensor device in FIG. 1 for various scanning points in FIG. 4.
Figure 6:
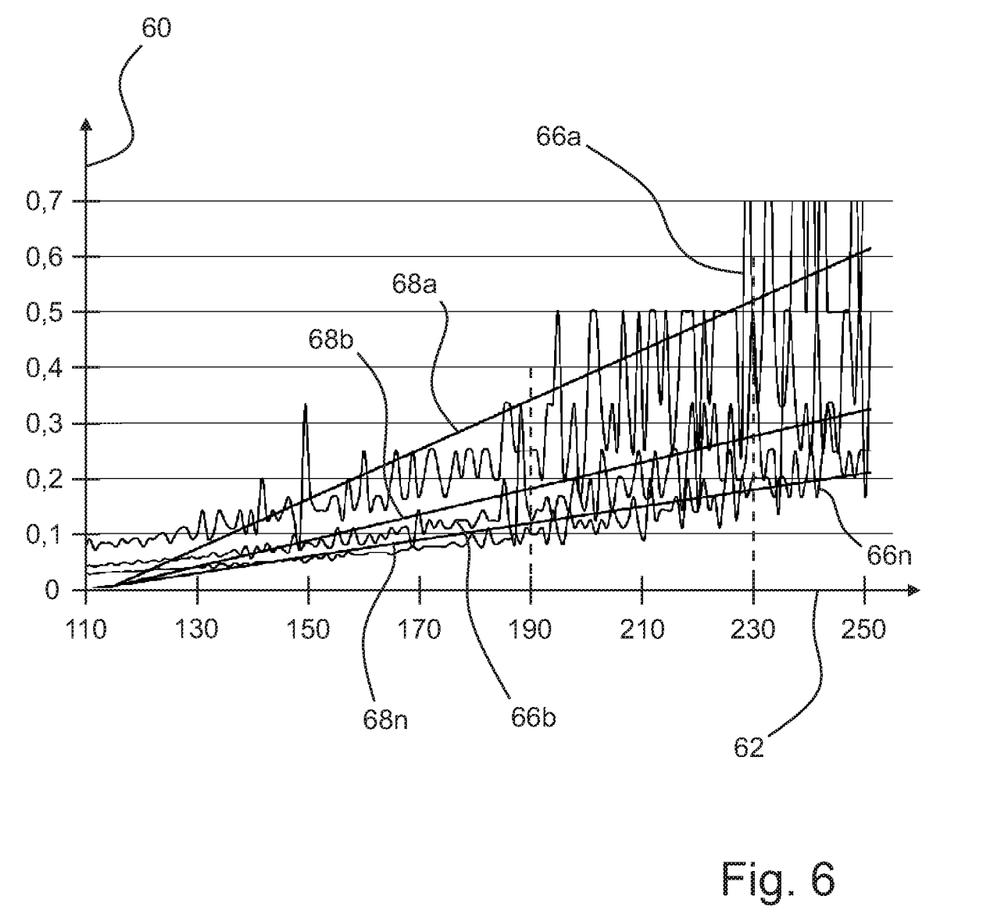
FIG. 6 shows a schematic depiction of a resolution of the characteristic curves in FIG. 5 dependent on the distance.

At a known brightness of the object, it is possible to obtain distance characteristic curves for each scanning point 52a-52n out of the corresponding scanning values S1-Sn for differing object distances. In FIG. 5, the scanning measurement, which is measured by means of the ADC 30, is applied in arbitrary units to an ordinate 54, and an abscissa 56 measures the object distance in millimetres. Reference numerals 58a-58n refer to the characteristic curves for the different scanning points 52a-52n. In FIG. 6, the associated resolution is depicted in millimetres per LSB (Least Significant Bit) on an ordinate 60 dependent on the distance in millimetres on the abscissa 62. Reference numerals 66a, 66b or 66n refer to the measured resolution, and reference numerals 86a, 86b or 66n refer to the linearly interpolated resolution for the characteristic curves 58a, 58b or 58n.

Here, a length of arrows 70a-70n in FIG. 5 respectively shows the ADC measurement range of the characteristic curves 58a-58n over a constant distance range for an object distance of from 110 millimetres to 260 millimetres as LSB. One can see from both diagrams that the highest resolution in the far range is shown by the characteristic curve 58n or the resolution 66n to 68n with the highest associated transmission current on the triangular-shaped transmission pulse 44. This is represented by the length of the arrow 70n. In contrast, the characteristic curve 58a or the resolution 66a or 68a with the lowest associated transmission current on the triangular-shaped transmission pulse 44 shows the lowest resolution in the far range. The resolution in the near range behaves similarly to the resolutions in FIG. 6. It should be noted that the resolutions below a particular object distance become zero, since the received characteristic curves 50a-50c come to the physical saturation level of the preamplifier 28 and/or of the ADC 30.

Corresponding characteristic curves can also be determined for the object brightness at a known object distance.

Thus, when the characteristic curve for the object distance or the object brightness is stored, the actual object distance or the object brightness can also be determined out of the scanning value when processing the receive signal 50a-50c in the method step S16. The characteristic curve or curves can be stored in a separate storage unit in the receiving path 14 which the ADC 30 can access during the signal processing in the step S16.

As already explained in FIG. 2, alternatively or additionally in the method step S16, after a correction of the scanning values S1-Sn optionally carried out by the dark measurement and/or after discarding individual scanning values which represent measurement outliers or saturation values, slope values for the remaining scanning points 52a-52n and their scanning values S1-Sn can be determined. These slope values can, in turn, be compared to one another in order to discard such scanning values S1-Sn for which the slope value determined significantly deviates upwards or downwards from the remaining slope values (for example when using corresponding slope threshold values). The remaining scanning values S1-Sn are then used in order to determine the object distance and/or the object brightness by means of the stored characteristic curves, as described above. Alternatively or additionally, out of the remaining scanning values, the slope values can be ascertained in order to ascertain the object brightness and/or the object distance for example when using corresponding stored characteristic curves.

In order to appropriately adapt the scanning values in terms of their amplitude such that they are evaluable in the method step S16, it is possible that the receive signal is increased or reduced constantly over all scanning points 52a-52n with a constant factor by means of the preamplifier 28. An increase with a constant factor of less than 1 can be carried out for the scanning values S1-Sn of the curve 50c, even when it represents an unusual measurement. As a result, the resolution of the photocurrent measured is adapted and the dynamic range of the sensor device 10 is increased.

Instead of a triangular shape, the signal shape of the transmission signal 44 or of the receive signal 50a-50c can also be trapezoid, parabolic or sinusoidal. The scanning points 52a-52n can also be provided in a falling flank of the respective signal 50a-50c or in a rising and falling signal flank. If a slope is determined, only scanning points 52a-52n or scanning values S1-Sn are considered for this which are found in the same flank of the signal 50a-50c.

Method steps S2-S4 and S14 are optional.

Although only a few embodiments of the present invention have been shown and described, it is to be understood that many changes and modifications may be made thereunto without departing from the spirit and scope of the invention.

What is claimed is:

1. An optical sensor device (10), having a transmission unit (24) for emitting light, a receiving unit (26) for receiving light emitted by the transmission unit (24), and an evaluation unit (30) for evaluating a receive signal (50a-50c) which is based on the received light, wherein the emitted light is designed as a light pulse which is based on a transmission signal (44), which has a signal shape with a rising and/or falling flank, wherein the receive signal (50a-50c) has substantially the same signal shape as the transmission signal (44), wherein the evaluation unit (30) is suitable for scanning the receive signal (50a-50c) at at least one scanning point (52a-52n) in its rising and/or falling flank.

2. The optical sensor device (10) according to claim 1, wherein the at least one scanning point (52a-52n) is fixed in time in a scanning operation.

3. The optical sensor device (10) according to claim 1, wherein a scanning point (52a-52n) with respect to time is allocated to a low transmission current in a transmission path (12).

4. The optical sensor device (10) according to claim 1, wherein a scanning point (52a-52n) with respect to time is allocated to a high transmission current in a transmission path (12).

5. The optical sensor device (10) according to claim 1, wherein a signal shape of the transmission signal (44) and of the receive signal (50a-50c) is triangular, trapezoid, parabolic or sinusoidal.

6. The optical sensor device (10) according to claim 1, wherein the evaluation unit (30) is suitable for scanning the receive signal (50a-50c) at at least two scanning points (52a-52n) in its rising flank and/or at least two scanning points (52a-52n) in its falling flank.

7. The optical sensor device (10) according to claim 1, wherein the receive signal (50a-50c) is amplifiable for the scanning at a scanning point (52a-52n) with allocated low transmission current, and/or the receive signal (50a-50c) can be decreased for the scanning at a scanning point (52a-52n) with allocated high transmission current.

8. The optical sensor device (10) according to claim 7, wherein an amplification of the receive signal (50a-50c) and/or a diminution of the receive signal (50a-50c) is constant in time.

9. The optical sensor device (10) according to claim 1, wherein the sensor device (10) is suitable for terminating the transmission signal (44) when the evaluation unit (30) has scanned an evaluable scanning point (52a-52n).

10. The optical sensor device (10) according to claim 1, wherein the evaluation unit (30) is suitable for determining a slope of the flank upon scanning at least two scanning points (52a-52n) in the rising flank and/or upon scanning at least two scanning points (52a-52n) in the falling flank.

11. The optical sensor device (10) according to claim 10, wherein the evaluation unit (30) is suitable for discarding, when determining the slope of the flank, at least one of the two scanning values (S1-Sn) for which its determined slope deviates from a remaining slope of the flank more or less than a corresponding threshold.

12. The optical sensor device (10) according to claim 1, wherein the evaluation unit (30) suitable for determining whether the at least one scanned scanning point (52a-52n) is sufficient to determine a valid sensor signal (S).

13. The optical sensor device (10) according to claim 1, wherein the evaluation unit (30) is suitable for scanning at least one further scanning point (53) which is temporally offset from the receive signal (50a-50c) to be scanned and for taking into account a scanning value (D) allocated to a further scanning point (53) upon a determination of a sensor signal (S).

14. A method for operating a sensor device, having the following steps:
   emitting (S10) light;
   receiving (S12) the emitted light; and
   evaluation (S16) of a receive signal (44) which is based on the light received;
   wherein the light emitted is designed as a light pulse which is based on a transmission signal (44) which has a signal shape with a rising and/or falling flank, wherein the receive signal (50a-50c) has substantially the same signal shape as the transmission signal (44); and
   wherein the evaluation (S16) of a receive signal (50a-50c) involves scanning (S16a) of the receive signal (50a-50c) at at least one scanning point (52a-52n) in its rising and/or falling flank.

15. The method according to claim 14, wherein the at least one scanning point (52a-52n) is fixed in time in a scanning process.

16. The method according to claim 14, wherein a scanning point (52a-52n) is allocated with respect to time to a low transmission current in a transmission path (12).

17. The method according to claim 14, wherein a scanning point (52a-52n) is allocated with respect to time to a high transmission current in a transmission path (12).

18. The method according to claim 14, wherein a signal shape of the transmission signal (44) or of the receive signal (50a-50c) is triangular, trapezoid, parabolic or sinusoidal.

19. The method according to claim 14, wherein the evaluation (S16) of a receive signal (50a-50c) involves scanning (S16a) of the receive signal (50a-50c) at at least two scanning points (52a-52n) in its rising flank and/or at at least two scanning points (52a-52n) in its falling flank.

20. The method according to claim 14, wherein the receive signal (50a-50c) is amplified for the scanning at a scanning point (52a-52n) with allocated low transmission current and/or the receive signal (50a-50c) is decreased for the scanning at a scanning point (52a-52n) with allocated high transmission current.

21. The method according to claim 20, wherein an amplification of the receive signal (50a-50c) and/or a diminution of the receive signal (50a-50c) is carried out constant in time.

22. The method according to claim 14, wherein the transmission signal (44) is terminated when an evaluable scanning point (52a-52n) has been scanned.

23. The method according to claim 14, wherein the evaluation (S16) of the receive signal (50a-50c) further involves determining (S16c) a slope of the flank upon scanning at least two scanning points (52a-52n) in the rising flank and/or upon scanning at least two scanning points (52a-52n) in the falling flank.

24. The method according to claim 23, wherein the evaluation (S16) of the receive signal (50a-50c) further involves discarding (S16e) upon determining (S16e) the slope of the flank of at least one of the two scanning values (S1-Sn) for which its determined slope deviates from a remaining slope of the flank more or less than a corresponding threshold value.

25. The method according to claim 14, wherein the evaluation (S16) of the receive signal (50a-50c) further involves determining whether the at least one scanned scanning point (52a-52n) is sufficient for determining a valid sensor signal (S).

26. The method according to claim 14, wherein the evaluation (S16) of the receive signal (50a-50c) further involves scanning (S16b) at at least one further scanning point (52) which is temporally offset from the receive signal to be scanned (50a-50c), and involves taking into account (S16b) a scanning value (D) allocated to the at least one further scanning point (52) upon determining a sensor signal (S).

27. A non-transitory computer-readable storage medium that stores a computer program comprising a set of computer-readable instructions, which, when executed by the computer, carries out steps of the method according to claim 14 to operate an optical sensor device (10).

* * * * *